(No Model.)

L. MOND.
OBTAINING AMMONIA AND CHLORINE FROM AMMONIUM CHLORIDE.

No. 379,488. Patented Mar. 13, 1888.

Witnesses
James F. DuHamel
Walter S. Dodge

Ludwig Mond,
Inventor
W. P. Thompson & Co.
Attys.
per Dodgerson,
Asso. Atty.

UNITED STATES PATENT OFFICE.

LUDWIG MOND, OF NORTHWICH, COUNTY OF CHESTER, ENGLAND.

OBTAINING AMMONIA AND CHLORINE FROM AMMONIUM CHLORIDE.

SPECIFICATION forming part of Letters Patent No. 379,488, dated March 13, 1888.

Application filed May 13, 1886. Serial No. 202,097. (No specimens.) Patented in England January 2, 1886, No. 66, January 23, 1886, No. 1,049, and March 8, 1886, No. 3,238; in France March 10, 1886, No. 161,994; in Belgium March 10, 1886, No. 53,333, and in Austria-Hungary March 18, 1886.

*To all whom it may concern:*

Be it known that I, LUDWIG MOND, a subject of the Queen of Great Britain, residing at Northwich, in the county of Chester, in the Kingdom of England, have invented certain new and useful Improvements in Obtaining Ammonia and Chlorine from Ammonium Chloride, (for which applications for provisional protection have been made in England, No. 66, dated January 2, 1886, No. 1,049, dated January 23, 1886, and No. 3,238, dated March 8, 1886, and for patents in France, No. 161,994, dated March 10, 1886, in Belgium No. 53,333, dated March 10, 1886, and in Austria-Hungary dated March 18, 1886, none of which have yet been issued,) of which the following is a specification.

If the vapor produced by volatilizing ammonium chloride is brought into contact at an elevated temperature with the tribasic phosphate or with the protoxide of nickel, or with one of numerous other metallic salts or oxides, or a mixture or combination of them, the hydrochloric acid or chlorine combines with the salt or oxide or its metal, and the ammonia passes off; also, if the chloride, oxychloride, or composite salt so formed is exposed at a suitable temperature to the action of hot air, preferably superheated, it is again converted into oxide or the original salt used, and chlorine is given off.

Figure 1:
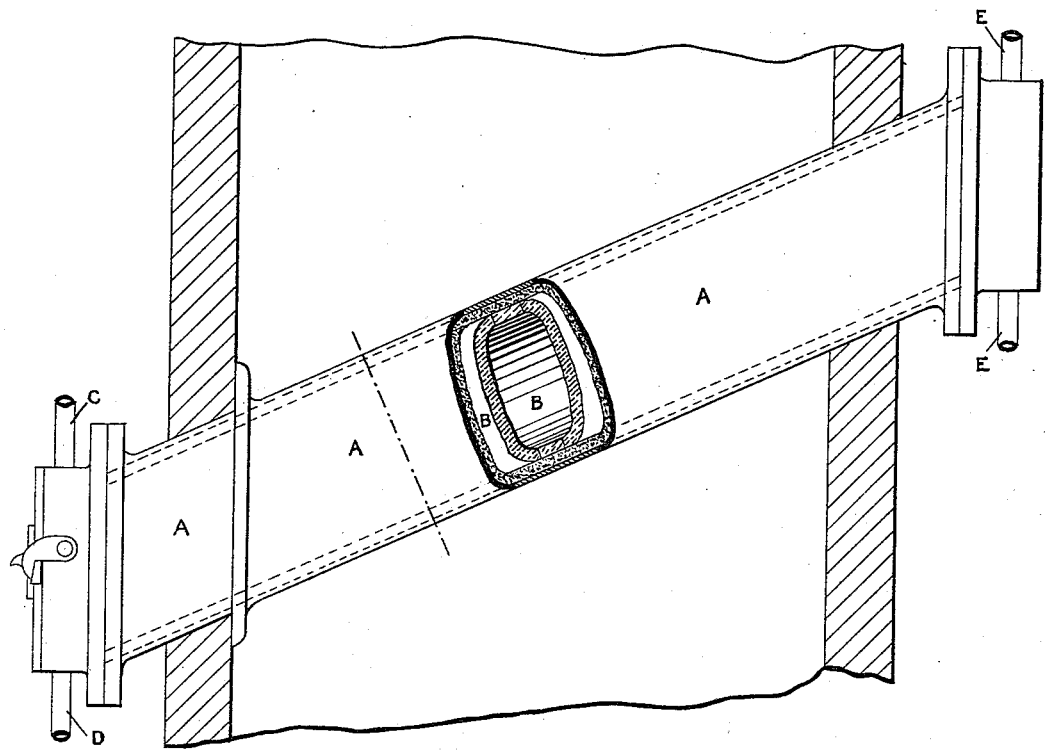
Figure 2:
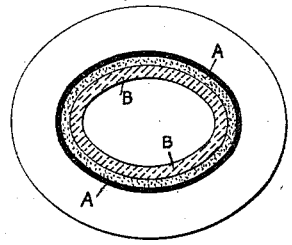

I carry out my invention based on these facts in the following manner and by the apparatus shown in the drawings, Figure 1 being an elevation, and Fig. 2 a section, of the retort.

Ammonium chloride is volatilized by the application of heat, and the vapor so produced is passed over or through the salt or oxide while heated to about 400° centigrade. The ammonium chloride may be mixed with the salt or oxide before heat is applied; but this is not necessary. In either case the hydrochloric acid leaves the ammonia and is retained by the salt or oxide, while the ammonia passes on and is utilized or absorbed in any convenient manner. I prefer to allow the substance used to remain in a single apparatus, in which I produce all the reactions. I then volatilize the chloride of ammonium in suitable heating apparatus, such as cylinders of cast-iron or pipes of small diameter, and I pass the vapor so obtained over the reacting substances prepared in the manner described further on. The hydrochloric acid is retained by the oxide or salt and forms a chloride or an oxychloride, while the ammonia continues its way, and may be absorbed or utilized outside of the apparatus in any suitable manner. Nevertheless, the operation being intermittent, it is necessary in order to avoid losses of ammonia to expel even the last traces before proceeding to the second phase of the process. For this purpose I sweep out the apparatus by a current of inert gas, such as the impure nitrogen escaping from the carbonators in the ammonia-soda process; but sometimes a single sweeping is insufficient, and I then employ an air-pump or other exhauster to extract the last traces of ammonia remaining in the reagent. After the vacuum a fresh application of inert gas generally completes the operation; but, if required, the two operations can be alternated as long as necessary. It now only remains to cause dry air to pass over the chloride or oxychloride formed in order to obtain chlorine and complete the cycle of operations, leaving the original salt or oxide re-formed in the chamber, ready for fresh chloridizing. The temperature requisite for this second portion of the reaction differs according to the oxides or the salts used, and is usually lower for these latter.

There is an advantage in selecting substances for which the temperatures employed in the two successive reactions differ as little as possible. For the protoxide of nickel the two temperatures are comprised between 350° and 500°. The air intended for the reaction can be at the same time heated sufficiently, so as to carry to the interior of the apparatus the heat necessary for the conduct of the process. This plan has the especial advantage of doing away with the direct heating of the chamber and of being able to give it a large diameter. It is desirable to give the greatest possible surface to the reacting substances while preserving in them a certain consistence and a sufficient passage for the gas. I attain this in several ways. I may manufacture balls or lumps or bricks of the oxide or salt by means of an inert binding material, such as clay, starch, treacle, &c., or mix the metallic oxides with a chloride in solution, and shape the paste into small lumps or bricks, which can be dried and heated in a current of air; or, again, I impregnate pumice-stone or other porous bodies with the metallic chloride solution desired, or with the salt, or with molten chloride or salt.

Besides the protoxide of nickel, which I prefer to any other, numerous other substances will act advantageously for the above-mentioned reactions, among the rest the oxides of cobalt, iron, manganese, aluminium, copper, bismuth, and other metals. In fact, nearly all the metallic oxides which do not fuse or decompose at 350° centigrade, or any mixture of them, can be used except the alkalies and some of the alkaline earths and the oxide of chromium. A large number of the neutral salts of the non-volatile polybasic acids—such as silicic, phosphoric, boric acid, or a mixture of these with the above-named oxides—can also be employed.

The oxides forming easily fusible or volatile chlorides—such as the oxides of zinc, tin, or lead—require special precautions, the admixture of inert substances and the accurate regulation of the heat, and cannot be recommended except in special cases. The salts of acids reduced by ammonia must be avoided, such as those of chromic and arsenic acids. The use of certain oxides—such as those of iron and of manganese, the chlorides of which give, under the action of oxygen, chlorine and a higher oxide—require also special precautions. If in the second phase of the process the vapors of chloride of ammonium be caused to pass over this higher oxide, there will ensue the destruction of a portion of the ammonia unless care be taken previously to reduce the higher oxide to the lower degree of oxidation by passing a reducing-gas over it—that from a gas producer, for instance.

As regards the construction of the retorts or cylinders used, I find that iron is acted upon to a certain extent by the vapors and gases produced in the process, so that it would have to be renewed from time to time. I therefore propose to use iron apparatus enameled on the inside, or lined or coated with suitable materials which will withstand the action of the vapors and gases at the temperature employed, such as ganister, fire-clay, carbon, graphite, plaster-of-paris, sulphate of baryta, &c. A convenient way of lining an iron retort or cylinder is to put inside of it a thin earthenware retort or cylinder a little smaller than the iron one, and to fill the space between the two with iron borings or any other suitable material. I also propose to make the apparatus for my process of nickel or cobalt, or of an alloy of these metals with others in which they predominate to such an extent as to make it resist the temperatures and the action of the vapors and gases produced in my process; but I prefer to use cast or wrought iron or steel covered or lined with nickel, cobalt, or an alloy of these metals, such as described.

In the drawings annexed, A is the iron cylinder; B, earthenware retort inside same; C, pipe for introducing hot air or the inert gas; D, pipe for introducing the vapor of ammonium; E, escape-pipe to carry off the ammonia and chlorine.

I am well aware that Walter Weldon, in British patent specifications Nos. 964, 965, 966, 967, and 968 of 1881, describes a process or series of processes for obtaining chlorine from hydrochloric acid by forming a chloride in the wet way, adding an oxide or highly-oxygenated body, forming the mass into cakes, drying, and treating with hot air, and I make no claim to such process.

I claim as my invention—

1. The process of obtaining ammonia and chlorine from solid ammonium chloride, which consists in vaporizing the ammonium chloride, passing the vapor at an elevated temperature over or through one or more of the oxides or salts herein set forth, loosely piled in a closed chamber or retort made of or lined with materials refractory to the chemicals employed—such, for instance, as nickel or cobalt—collecting the ammonia thereby separated, passing a neutral gas (such as described) through the chamber or retort to drive out the residual ammonia, then forming a partial vacuum in the retort or chamber, then passing through the chamber or retort still containing the solid materials previously acted upon, and maintained at a suitable temperature, air preferably dried and heated to such a temperature as to supply as far as possible the heat required for carrying on the reactions and for making up the loss by radiation and other causes, thereby obtaining a mixture of gas composed of chlorine, oxygen, and nitrogen which can be utilized in the manufacturing of bleaching-powder or otherwise; lastly, if the salt or oxide used has by the passage of air been oxidized higher than is desirable, passing a reducing-gas—such as producer-gas—over the residues, and then beginning the cycle of operations afresh.

2. The process of obtaining ammonia and chlorine from ammonium chloride, which consists in bringing the vapor of the ammonium chloride in contact with one or more oxides or salts, such as described, at an elevated temperature till the oxide or salt is sufficiently chloridized, and then passing in air at a suitable temperature to obtain chlorine.

3. The improvement in the process of obtaining ammonia from ammonium chloride, which consists in passing the vapor of ammonium chloride at an elevated temperature over or through the residual oxides or salts from the oxidizing operation, so as to obtain ammonia.

4. The improvement in the process of obtaining ammonia from ammonium chloride, which consists in forming one or more of the oxides or salts above described into bricks or lumps, loosely piling them in a chamber, and bringing them in contact with the ammonium chloride at an elevated temperature, such as described.

5. The process of obtaining ammonia and chlorine successively from ammonium chloride, which consists in passing successively vapor of ammonium chloride, a neutral gas, and (after exhaustion) air, preferably previously dried and heated, through one and the same chamber containing one or more of the salts or oxides herein described loosely piled, and repeating the process continuously, so as to use the same materials continuously without handling or moving them in any way.

6. The improvement in the process of obtaining ammonia and chlorine successively from ammonium chloride, which consists in passing the vapor of ammonium chloride through a vessel or chamber containing one or more salts or oxides, such as described, and then driving out the residual ammonia by means of a neutral gas and collecting the same, whereby before blowing in air all the ammonia is saved instead of being partially wasted, as it would be if the air were admitted instead of the neutral gas.

7. The improvement in the process of obtaining ammonia and chlorine from ammonium chloride, which consists in obtaining the ammonia in the manner described, thoroughly clearing the retort of the residual ammonia by successive passing through of neutral gas and exhausting, and then obtaining the chlorine, substantially as described.

8. The improvement in obtaining chlorine from the residue obtained by treating with ammonium chloride one or more of the oxides or salts herein described, which consists in passing over such residue air deprived of its moisture and heated to a degree sufficient to carry on the reaction and supply the loss from radiation and other causes.

9. The improvement in the process of obtaining ammonia and chlorine from ammonium chloride, which consists in passing a reducing-gas—such as a producer-gas—over the residue from the second operation if an oxide or salt has been employed which is oxidized higher than desirable, such as oxides or salts of iron or manganese, before using it again for the first operation.

In testimony whereof I have signed my name to this specification in the presence of two subscribing witnesses.

LUDWIG MOND.

Witnesses:
 WM. P. THOMPSON,
 J. OWDEN O'BRIEN.